US011377140B2

(12) United States Patent
Sanford et al.

(10) Patent No.: US 11,377,140 B2
(45) Date of Patent: Jul. 5, 2022

(54) NOTIFICATION FOR RACK LIMITING CONDITIONS FOR STEER BY WIRE STEERING SYSTEMS (71) Applicant: STEERING SOLUTIONS IP HOLDING CORPORATION, Saginaw, MI (US)

(72) Inventors: Scott T. Sanford, Swartz Creek, MI (US); Patrick M. Ryne, Midland, MI (US); Nick M. Trewhella, Sanford, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 703 days.

(21) Appl. No.: 16/204,346

(22) Filed: Nov. 29, 2018

(65) Prior Publication Data
US 2019/0176874 A1 Jun. 13, 2019

Related U.S. Application Data (60) Provisional application No. 62/595,751, filed on Dec. 7, 2017.

(51) Int. Cl.
*B62D 5/04* (2006.01)
*B62D 5/00* (2006.01)
(Continued)

(52) U.S. Cl.
CPC .......... *B62D 5/0463* (2013.01); *B62D 5/001* (2013.01); *B62D 5/005* (2013.01); *B62D 6/008* (2013.01);
(Continued)

(58) Field of Classification Search
CPC .... B62D 15/0225; B62D 5/001; B62D 5/005; B62D 5/0418; B62D 5/0463; B62D 5/0469; B62D 6/008; B62D 6/10; G01L 5/221
See application file for complete search history.

(56) References Cited

U.S. PATENT DOCUMENTS

| 5,198,981 A | 3/1993 | Collier-Hallman et al. |
| 5,704,446 A | 1/1998 | Chandy et al. |
| (Continued) | | |

FOREIGN PATENT DOCUMENTS

| DE | 10109085 A1 | 9/2002 |
| DE | 10305132 A1 | 11/2004 |
| (Continued) | | |

OTHER PUBLICATIONS

Chinese Office Action for related CN Application No. 201710276742.0 , dated: Aug. 24, 2018; 12 pages.
(Continued)

*Primary Examiner* — Hunter B Lonsberry
*Assistant Examiner* — Daniel L Greene
(74) *Attorney, Agent, or Firm* — Dickinson Wright PLLC (57) ABSTRACT

Technical solutions are described herein for steer-by-wire (SBW) steering systems to detect an end-of-travel condition dynamically and generate responsive handwheel torque for a driver. According to one or more embodiments, a steer-by-wire steering system includes a first controller that generates a plurality of torque commands. Generating the plurality of torque commands includes generating a curb torque command in response to detecting a curb condition in which road wheels are stationary despite a change in handwheel position, and generating an end-of-travel torque command in response to detecting an end-of-travel condition. The steer-by-wire steering system further includes an arbitrator mod-
(Continued)

ule that determines a notification torque command by arbitrating between the plurality of torque commands, which comprises the curb torque command and the end-of-travel torque command. The steer-by-wire steering system further includes a second controller that generates a notification torque using the notification torque command.

20 Claims, 5 Drawing Sheets

(51) Int. Cl.
  *B62D 6/10* (2006.01)
  *G01L 5/22* (2006.01)
  *B62D 6/00* (2006.01)
  *B62D 15/02* (2006.01)
(52) U.S. Cl.
  CPC .............. *B62D 6/10* (2013.01); *B62D 5/0418* (2013.01); *B62D 5/0469* (2013.01); *B62D 15/0225* (2013.01); *G01L 5/221* (2013.01)

(56) References Cited

U.S. PATENT DOCUMENTS

| | | | | |
|---|---|---|---|---|
| 6,219,604 | B1* | 4/2001 | Dilger | B62D 6/003 |
| | | | | 180/422 |
| 6,370,460 | B1 | 4/2002 | Kaufmann et al. | |
| 6,625,530 | B1 | 9/2003 | Bolourchi | |
| 7,512,468 | B2 | 3/2009 | Tamaizumi et al. | |
| 2003/0060955 | A1 | 3/2003 | Suissa | |
| 2003/0146037 | A1* | 8/2003 | Menjak | B62D 5/006 |
| | | | | 180/402 |
| 2005/0082106 | A1* | 4/2005 | Husain | B62D 5/006 |
| | | | | 180/402 |
| 2005/0082108 | A1* | 4/2005 | Husain | B62D 5/006 |
| | | | | 180/402 |
| 2005/0256620 | A1 | 11/2005 | Kato et al. | |
| 2006/0080016 | A1* | 4/2006 | Kasahara | B62D 6/001 |
| | | | | 701/41 |
| 2008/0053740 | A1* | 3/2008 | Hublart | B62D 5/006 |
| | | | | 180/406 |
| 2009/0222168 | A1* | 9/2009 | Egenfeldt | B62D 5/0481 |
| | | | | 701/42 |
| 2011/0098887 | A1* | 4/2011 | Fujimoto | B62D 5/0469 |
| | | | | 701/41 |
| 2012/0046836 | A1 | 2/2012 | Strecker et al. | |
| 2014/0257641 | A1 | 9/2014 | Champagne et al. | |
| 2015/0367884 | A1 | 12/2015 | George et al. | |
| 2016/0264172 | A1 | 9/2016 | Oiki et al. | |
| 2016/0272197 | A1 | 9/2016 | Hulten et al. | |
| 2016/0280251 | A1 | 9/2016 | George et al. | |
| 2017/0203785 | A1 | 7/2017 | Naik et al. | |
| 2017/0232958 | A1* | 8/2017 | Hata | B60W 20/40 |
| | | | | 701/22 |
| 2017/0232998 | A1 | 8/2017 | Ramanujam et al. | |
| 2018/0082492 | A1* | 3/2018 | Stanek | G07C 5/0808 |
| 2019/0126971 | A1* | 5/2019 | Kim | B62D 5/006 |

FOREIGN PATENT DOCUMENTS

| | | |
|---|---|---|
| DE | 102010030986 A1 | 1/2012 |
| DE | 102013014122 A1 | 2/2015 |

OTHER PUBLICATIONS

Varunjikar, Tejas, "Design of Horizontal Curves with Downgrades Using Low-Order Vehicle Dynamics Models," A Thesis in Mechanical Engineering, The Pennsylvania State University, The Graduate School Department of Mechanical Engineering, May 2011, pp. 1-141, University Park, Pennsylvania.
German Search Report, with English translation, dated May 7, 2021 for German Application No. 102018130664.4, 14 pages.
Third Chinese Office Action for Chinese Application No. 201811494210.5 dated Feb. 16, 2022, 5 pages.

* cited by examiner

NOTIFICATION FOR RACK LIMITING CONDITIONS FOR STEER BY WIRE STEERING SYSTEMS

CROSS-REFERENCES TO RELATED APPLICATIONS

This patent application claims priority to U.S. Provisional Patent Application Ser. No. 62/595,751, filed Dec. 7, 2017, which is incorporated herein by reference in its entirety.

BACKGROUND

Steer by wire (SBW) steering systems do not have a direct mechanical connection between the human driver and the steerable road wheels, rather input from the human driver is conveyed to the road wheels using one or more electrical signals that cause torque to be generated and applied at the road wheels. The driver interacts with a handwheel actuator (HWA), and the road wheels are steered by a road wheel actuator (RWA). These two systems are only linked electrically (by wires).

SUMMARY

Technical solutions are described herein for steer-by-wire (SBW) steering systems to detect a dynamic end-of-travel condition dynamically and generate responsive handwheel torque for a driver.

According to one or more embodiments, a steer-by-wire steering system includes a first controller that generates a plurality of torque commands. Generating the plurality of torque commands includes generating a curb torque command in response to detecting a curb condition in which road wheels are stationary despite a change in handwheel position, and generating an end-of-travel torque command in response to detecting an end-of-travel condition. The steer-by-wire steering system further includes an arbitrator module that determines a notification torque command by arbitrating between the plurality of torque commands, which comprises the curb torque command and the end-of-travel torque command. The steer-by-wire steering system further includes a second controller that generates a notification torque using the notification torque command.

According to one or more embodiments, a method includes generating, by a first controller, a plurality of torque commands. Generating the plurality of torque commands includes generating a curb torque command in response to detecting a curb condition in which road wheels are stationary despite a change in handwheel position, and generating an end-of-travel torque command in response to detecting an end-of-travel condition. The method further includes determining, by an arbitrator module, a notification torque command by arbitrating between the plurality of torque commands, which comprises the curb torque command and the end-of-travel torque command. The method further includes generating, by a second controller, a notification torque using the notification torque command.

According to one or more embodiments, a computer program product comprising a computer readable storage device with computer executable instructions stored thereon, the computer executable instructions when executed cause a processing unit to perform a method that includes generating, by a first controller, a plurality of torque commands. Generating the plurality of torque commands includes generating a curb torque command in response to detecting a curb condition in which road wheels are stationary despite a change in handwheel position, and generating an end-of-travel torque command in response to detecting an end-of-travel condition. The method further includes determining, by an arbitrator module, a notification torque command by arbitrating between the plurality of torque commands, which comprises the curb torque command and the end-of-travel torque command. The method further includes generating, by a second controller, a notification torque using the notification torque command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Several embodiments of steer-by-wire (SBW) steering systems and their components are described, particularly for providing end-of-travel condition detection for SBW steering systems.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

When driving a vehicle various driving maneuvers and environment condition (e.g. low friction surface) can lead to one or more tire forces reaching near-limit conditions. The vehicle can have undesired yaw behavior in such conditions. Such a behavior is often described as an understeer condition (vehicle yawing less than desired) or an oversteer condition (vehicle yawing more than desired). Although the society of automotive engineers (SAE) has defined such conditions in steady state situations, the situations occur in both steady state and transient (dynamic) state. Typically, electronic stability control uses selective braking and other techniques to control the vehicle when understeer or oversteer conditions are detected. However, such techniques are reactive to driver maneuvers in the understeer and oversteer conditions.

Accordingly, it is desirable to improve a steering system of the vehicle such that the steering system can facilitate proactively assisting the driver with maneuvers in case of vehicle motion states such as the understeer and oversteer conditions. In one or more examples, the understeer/oversteer conditions are detected and handled in steering systems using closed-loop torque control by communicating proper tire/road loads via a yaw rate. In one or more examples, a yaw acceleration detection scheme is also used which modifies column motor torques in the steering system.

In addition to the understeer/oversteer control, steering systems also provide an End-of-Travel (EoT) control that is used to provide a EoT Soft-Stop function, used in SBW and other steering system applications. These functions aid in controlling the HWA torque levels when the steering system is approaching its mechanical limit. For example, a torque generated in the HWA is increased when nearing EoT to "soften" the torques experienced by the HWA in SBW, and in Base EPS the motor assist is decreased for such softening.

In addition to the dynamic states described above, a technical challenge that exists with SBW systems is detection and handling of curb/rut or other obstruction. When a vehicle is subjected to environmental conditions which limit the rack travel because of the lack of mechanical connections between the rack and the hand wheel, the driver may not realize that the vehicle is in a situation where his/her maneuver of the handwheel does not cause the road wheels to move. It will be appreciated that, as used and defined herein, the term "curb" may refer to any type of environmental obstruction encountered by one or more roadwheels that would cause a limit of rack travel and is not to be interpreted as only a physical road curb. In non-limited examples, the term "curb" as used herein may refer to any environmental obstruction such as a physical curb, a rut, a ramp, a raised or depressed sewer grate, a small ditch or hump, etc. The technical solutions described herein facilitate detecting such a condition and, in response, causing an increase in torque in the HWA. Such an increased torque can indicate to the driver the increased rack loads at the RWA.

Figure 1:
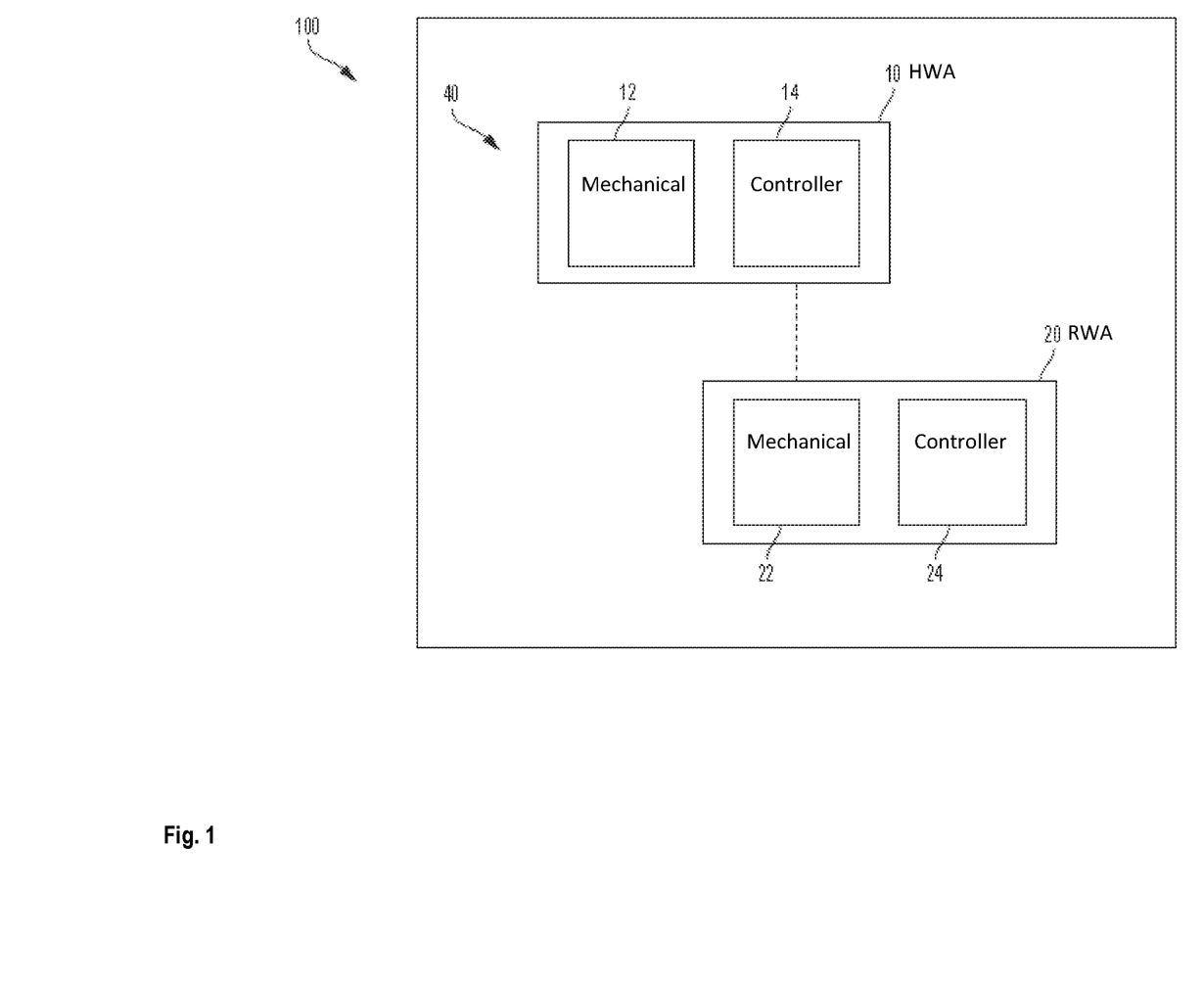
FIG. 1 illustrates a vehicle including a steering system, according to one or more embodiments.

Referring now to the Figures, where the invention will be described with reference to specific embodiments, without limiting same, a steer by wire steering (SBW) system 40 in a vehicle 100 is depicted in FIG. 1. It will be appreciated that the SBW system 40 shown and described can be used in an autonomous or semi-autonomous vehicle or in a more conventional vehicle. The SBW system 40 includes a handwheel actuator (HWA) 10 and a roadwheel actuator (RWA) 20.

The HWA 10 includes one or more mechanical components 12, such as a handwheel (steering wheel), a steering column, a motor/inverter attached to the steering column either through a gear mechanism or a direct drive system. The HWA 10 further includes a microcontroller 14 that controls the operation of the mechanical components 12. The microcontroller 14 receives and/or generates torque via the one or more mechanical components 12.

The RWA includes one or more mechanical components 22, such as a steering rack and/or pinion coupled to a motor/inverter through a ball-nut/ball-screw (gear) arrangement, and the rack is connected to the vehicle roadwheels/tires through tie-rods. The RWA 20 includes a microcontroller 24 that controls the operation of the mechanical components 22. The microcontroller 24 receives and/or generates torque via the one or more mechanical components 22.

The microcontrollers 14 and 24 are coupled through electrical connections that allow signals to be transmitted/received. As referred to herein, a controller can include a combination of the HWA controller 14 and the RWA controller 24, or any one of the specific microcontrollers.

In one or more examples, the controllers 14 and 24 of the SBW system 40 communicate with each other through CAN interface (or other similar digital communication protocols). Guidance of the vehicle 100 that is fitted with the SBW system 40 is performed by use of the steering gear, with an input shaft that is rotated by the RWA 20, such as a servo actuator. The RWA 20 receives an electronic communication signal of rotation of the steering wheel by the driver. A driver controls the steering wheel to directionally control the vehicle 100. The angle from HWA 10 is sent to the RWA 20 which performs position control to control rack travel to guide the roadwheel. However, due to the lack of mechanical connection between the steering wheel and the road wheels, the driver is not provided with a feel for the road without torque feedback (unlike the case in an EPS as described earlier).

In one or more examples, the HWA 10 that is coupled to the steering column and steering wheel simulates the driver's feel of the road. The HWA 10 may apply tactile feedback in the form of torque to the steering wheel. The HWA 10 receives a rack force signal from the RWA 20 to generate an appropriate torque feel for the driver. Alternatively, the handwheel angle and vehicle speed can also be used to generate desired torque feel to the driver.

As described earlier, in an electric power steering (EPS) with mechanical connections between the roadwheel and the handwheel, the driver can feel effects of roadwheel conditions such as curb/rut condition, oversteer/understeer, EoT, and the like. Further, in case of such EPS numerous algorithms are known that control or mitigate the effect of such disturbances experienced by the driver (i.e. steering feel), for example, limiting an assist torque generated by the EPS.

Figure 2:
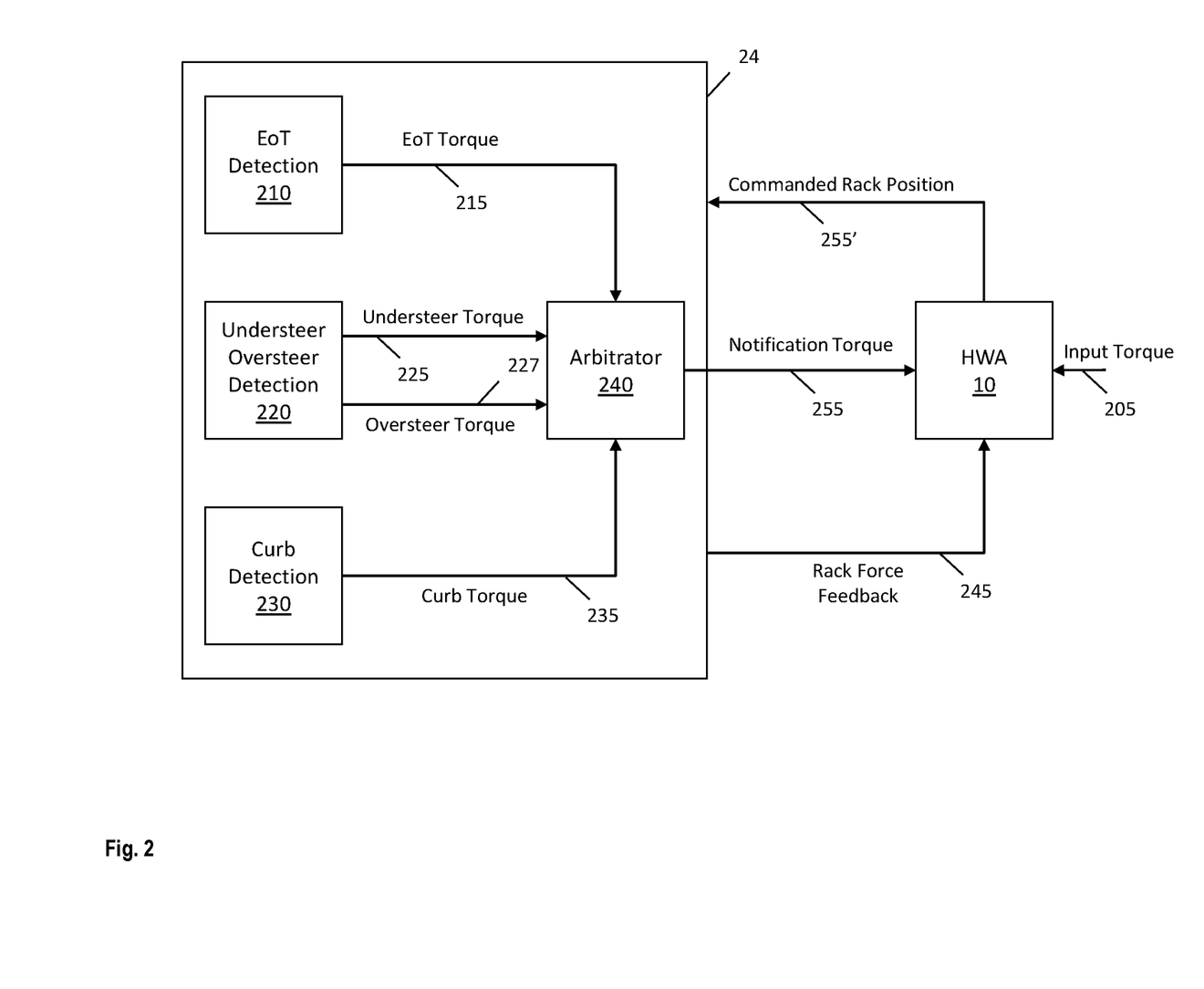
FIG. 2 depicts a block diagram for generation of additional torque command for a handwheel actuator according to one or more embodiments.

FIG. 2 depicts a block diagram for generation of additional torque command for the HWA according to one or more embodiments. The RWA controller 24 generates a RWA feedback torque command 245 that is provided to the HWA 10. The RWA feedback torque command 245 is based on a position of the road wheels (or rack). The HWA 10 uses the RWA feedback torque command 245, in addition to input torque 205 from the operator, to generate a commanded position for the road wheels (or rack). The commanded position is then sent to the RWA controller 24.

In addition to the RWA feedback torque command 245, technical solutions described herein generates a notification torque command 255 to notify the operator of one or more dynamic conditions including an EoT, an understeer, an oversteer, a curb detection, and the like. The notification torque command 255 is used by the HWA 10 to generate additional torque at the handwheel 12 or any other input device of the SBW system 40. In one or more examples, the amount of torque that is generated corresponding to the notification torque command 255 can cause the operator to provide additional effort to move the handwheel 12. Alternatively, or in addition, the notification torque that is generated can cause the handwheel 12 to vibrate or shake. Alternatively, or in addition, the notification torque command is subtractive and causes the HWA 10 to generate lesser amount of torque than that corresponding to the RWA feedback torque command 245. It should be noted that although, in the examples of the technical solutions described herein, the notification torque command 255 is added with the RWA feedback torque command 245, in one or more examples, the notification torque command 255 can be scaled, saturated, and/or filtered before such addition, and further, in one or more examples, the notification torque command 255 can be blended with the RWA feedback torque command 245 using different techniques.

As depicted in FIG. 2, the notification torque command 255 is generated based on one or more torque commands that are generated corresponding to one or more dynamic conditions that are detected by the RWA controller 24. An arbitrator 240 generates the notification torque command 255 based on an EoT torque command 215, an understeer torque command 225, an oversteer torque command 227, and a curb torque command 235. It should be noted that in other examples, different, fewer, or additional torque commands can be input to the arbitrator 240 based on different dynamic conditions detected by the RWA controller 24.

FIG. 2 depicts separate condition detection modules, such as an EoT detection module 210, an understeer-oversteer detection (USOS detection) module 220, a curb detection module 230, however, in one or more examples, the RWA controller 24 may not have separate modules for each condition to be detected. The arbitrator 240 can also be combined with one or more of the detection modules, and in one or more examples, all the depicted modules can be part of a single component.

Figure 3:
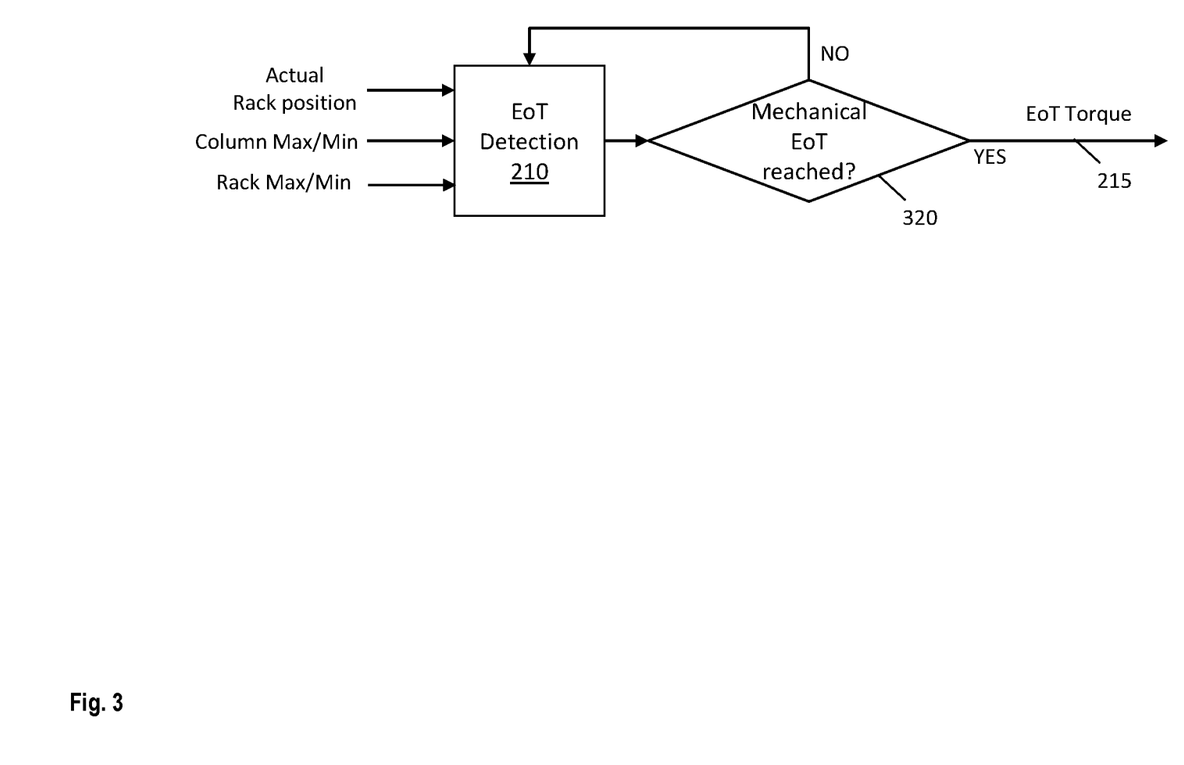
FIG. 3 depicts an end of travel detection according to one or more embodiments.

FIG. 3 depicts an EoT detection according to one or more embodiments. The EoT detection module 210 compares an actual rack position with predetermined limits of the column and the rack to determine if a mechanical EoT has reached (320). The actual rack position can be different than the commanded rack position 255' from the HWA 10. If the EoT condition is not satisfied, i.e. the actual rack position is within the predetermined limits, the EoT torque command 215 is not generated (or has substantially a value of 0). Otherwise, the EoT detection module 210 generates the EoT torque command 215. In one or more examples, the EoT torque command 215 is based on a difference between the actual rack position and the closest predetermined limits. For example, a lookup table is used that provides an EoT torque command to be generated for how much the actual rack position exceeds the limit.

Figure 4:
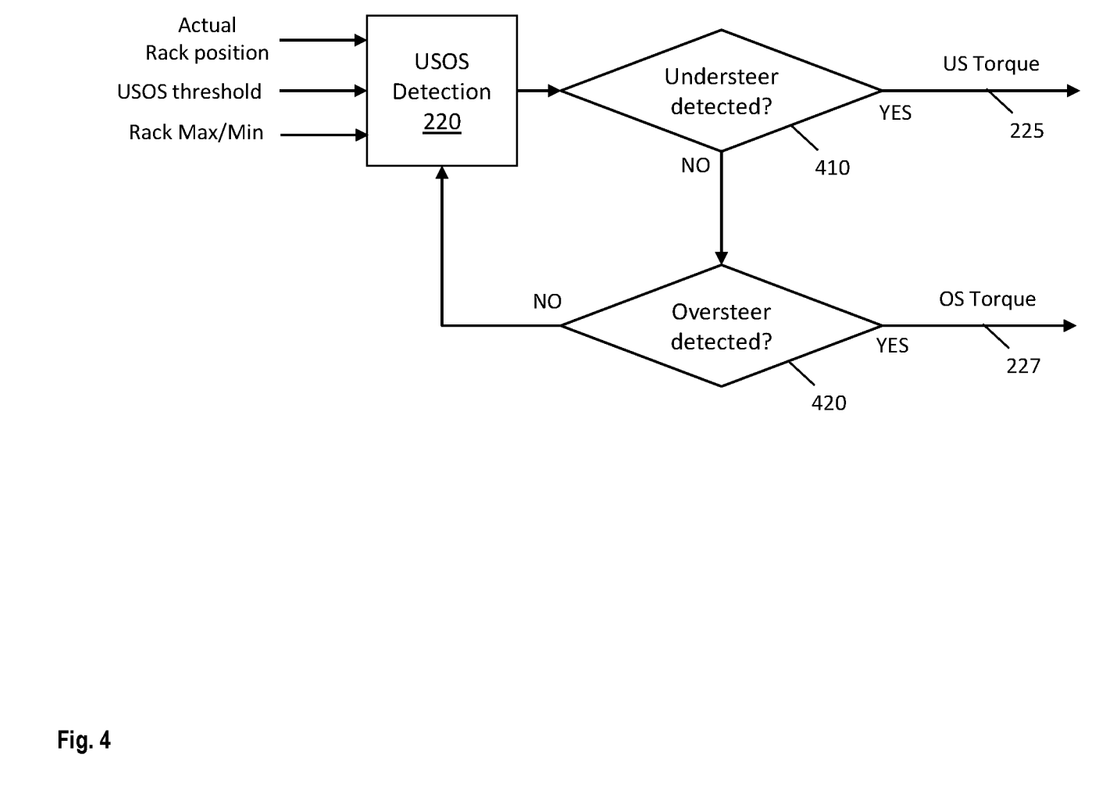
FIG. 4 depicts an understeer/oversteer detection according to one or more embodiments.

FIG. 4 depicts an USOS detection according to one or more embodiments. The USOS detection module 220 compares the actual rack position with one or more predetermined USOS threshold values to determine if understeer or oversteer is detected. Any of the known techniques for detecting understeer and/or oversteer can be used. In the depicted example, first an understeer is detected (410), for example, by comparing the threshold value with a USOS index that is based on yaw rates and/or yaw accelerations. In one or more examples, the yaw rate and yaw acceleration values are measured using one or more sensors, or are estimated based on other parameter values. If the understeer condition exists, the USOS detection module 220 generates the US torque command 225. A value of the US torque command 225 can be determined using a lookup table based on the USOS index value.

If an understeer condition is not detected (410), the USOS detection module 220 determines whether an oversteer condition exists (420). If neither an understeer or an oversteer condition exists, neither the US torque command 225 nor the OS torque command 227 is generated (or substantially have 0 value). Alternatively, if the oversteer condition is detected (based on the USOS index), the USOS detection module 220 generates the OS torque command 227. A value of the OS torque command 227 can be determined using a lookup table based on the USOS index. The USOS detection module 220 accordingly communicates tire/road loads via a yaw rate and yaw acceleration detection scheme which modifies the HWA torque.

Figure 5:
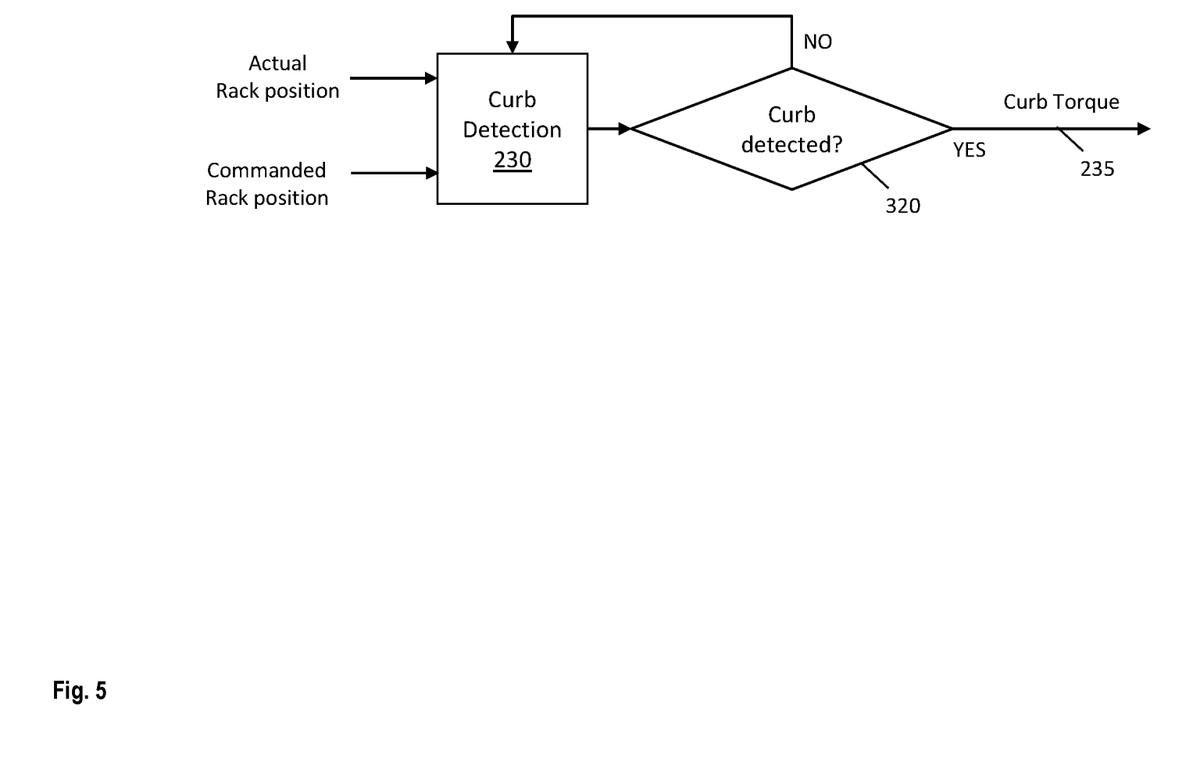
FIG. 5 depicts a curb detection according to one or more embodiments.

FIG. 5 depicts a curb detection according to one or more embodiments. In one or more examples, the curb detection module 230 compares the actual rack position with a commanded rack position from the HWA 10. Any other technique for detecting curb can be used. If a curb is not detected the curb torque command 235 is not generated (or has substantially 0 value). Alternatively, if curb condition is detected, the curb detection module 230 generates the curb torque command 235, for example, based on a difference between the actual rack position and the commanded rack position. For example, a lookup table based on the difference can be used to determine a value of the curb torque command 235.

It should be noted that examples of the end of travel detection, the curb detection, and the understeer/oversteer detection described above are just a few examples. In one or more embodiments of the technical solutions described herein, the conditions can be detected using different techniques without deviating from the features of the technical solutions described herein.

Referring to FIG. 2, the arbitrator 240 receives the EoT torque command 215, the US torque command 225, the OS torque command 227, and the curb torque command 235. The arbitrator 240, upon receiving the one or more torque commands from the corresponding condition detection modules, generates the notification torque command 255. For example, the arbitrator 240 selects the torque command that has the largest amount of torque to be generated. Alternatively, or in addition, the arbitrator 240 can compute an average amount of torque to be generated based on the input torque commands and send the notification torque command 255 corresponding to the average torque amount. In one or more examples, the average can be a weighted average based on predetermined weight values. Any other technique can be used for determining the notification torque value by the arbitrator 240.

In one or more examples, the arbitrator 240 can determine a magnitude of the notification torque command 255 based on the input torque commands and set a direction of the notification torque command to be in opposite direction to an input torque being applied by the operator. The notification torque command 255, in this way, causes the operator to apply extra effort to maneuver the handwheel 12, and is therefore, notified that the road wheel (or rack) is experiencing one or more of the above described conditions preventing or inhibiting further movement. In one or more examples, the notification torque command 255 causes a vibration of the handwheel 12 providing the notification to the operator.

Accordingly, the RWA controller 24 utilizes multiple dynamic conditions experienced by the RWA 20 to implement a notification torque command to the handwheel 12.

Various present SBW systems that use closed-loop torque control in the HWA 10 are based on algorithms, which generate a torque command within a predetermined range. The predetermined range is limited to torque sensing capabilities of the RWA 20, typically 10 Nm. However, when driving at slower vehicle speeds below a predetermined threshold (such as 20 MPH, 5 MPH, or the like), torque commands from the closed-loop torque control algorithms can generate torque commands of values smaller than the predetermined range regardless of estimated rack loads. So, when the vehicle is in a "rut", or against a "curb", the rack loads are not represented in the HWA 10. The operator in such cases can increase the handwheel angle, and the rack does not follow (cannot move due to the curb or rut). By employing the notification torque generation in these scenarios, the SBW system 40 generates more torque than the sensing range (>10 Nm). The torque generation is now limited only by the torque capabilities of the HWA 10. For example, a typical HWA can generate torque as high as 65 Nm, if desired. By detecting the dynamic conditions, such as those described herein, and increasing the handwheel torque level using the notification torque command, the technical solutions described herein facilitate the SBW system 40 to minimize the error in HWA 10 and RWA 20 positions and ease the re-synchronization to align the HWA 10 and the RWA 20 when the one or more conditions no longer exist and return back to normal operating conditions.

The technical solutions described herein improves operation of an SBW system by creating additional torque in the HWA for varying vehicle situations. The additional torque that is created, in one or more examples, is experienced by the operator via the input device, such as a handwheel of the SBW. The operator is accordingly notified of the one or more vehicle situations. In addition, the additional torque facilitates resynchronization RWA and HWA. Further yet, the technical solutions described herein facilitates the operator to be notified with the additional torque that can be generated up to a larger range than limiting the torque range to sensing capabilities.

For example, if and when the operator commands inputs which put the vehicle into an understeer (less yaw rate than desired) or oversteer (more yaw than desired), modifying the steering wheel torque assists the operator to return the vehicle into a desirable steering angle range to dynamically stabilize the vehicle. Alternatively, or in addition, when the vehicle is subjected to environmental conditions which limit the rack travel (e.g.: a "rut", "curb", etc.) the increase in torque to the HWA can be used to indicate to the operator of what is happening in terms of rack loads at the RWA.

The technical solutions described herein accordingly adjust the handwheel torque the HWA is generating using the notification torque command that the RWA controller provides. The notification torque command, as described herein is based on one or more rack limitation conditions that are detected.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A steer-by-wire steering system comprising:
    a first controller that generates a plurality of torque commands, generating the plurality of torque commands comprises:
        generating a curb torque command in response to detecting a curb condition in which road wheels are stationary despite a change in handwheel position; and
        generating an end-of-travel torque command in response to detecting an end-of-travel condition;
    an arbitrator module that, in response to determining a largest torque command of the curb torque command, the end-of-travel torque command, an understeer torque command, and an oversteer torque command, determines a notification torque command based on the largest torque command; and
    a second controller that generates a notification torque using the notification torque command.

2. The steer-by-wire steering system of claim 1, wherein the arbitrator module, in response to determining an average torque command of the curb torque command, the end-of-travel torque command, an understeer torque command, and an oversteer torque command, determines the notification torque command based on the average torque command.

3. The steer-by-wire steering system of claim 1, wherein generating the plurality of torque commands further comprises generating the understeer torque command in response to detecting an understeer condition.

4. The steer-by-wire steering system of claim 1, wherein generating the plurality of torque commands further comprises generating the oversteer torque command in response to detecting an oversteer condition.

5. The steer-by-wire steering system of claim 1, wherein the notification torque command is added to a rack feedback torque command that is corresponding to a rack force.

6. The steer-by-wire steering system of claim 1, wherein the notification torque command is in opposite direction to an input torque being applied by an operator.

7. The steer-by-wire steering system of claim 1, wherein the notification torque command causes a vibration of a handwheel.

8. A method comprising:
   generating, by a first controller, a plurality of torque commands, generating the plurality of torque commands comprises:
      generating a curb torque command in response to detecting a curb condition in which road wheels are stationary despite a change in handwheel position; and
      generating an end-of-travel torque command in response to detecting an end-of-travel condition;
   in response to determining a largest torque command of the curb torque command, the end-of-travel torque command, an understeer torque command, and an oversteer torque command, determining, by an arbitrator module, a notification torque command based on the largest torque command; and
   generating, by a second controller, a notification torque using the notification torque command.

9. The method of claim 8, wherein, in response to determining an average torque command of the curb torque command, the end-of-travel torque command, an understeer torque command, and an oversteer torque command, determining, the by arbitrator module, the notification torque command based on the average torque command.

10. The method of claim 8, wherein generating the plurality of torque commands further comprises generating the understeer torque command in response to detecting an understeer condition.

11. The method of claim 8, wherein generating the plurality of torque commands further comprises generating the oversteer torque command in response to detecting an oversteer condition.

12. The method of claim 8, wherein the notification torque command is added to a rack feedback torque command that is corresponding to a rack force.

13. The method of claim 8, wherein the notification torque command is in opposite direction to an input torque being applied by an operator.

14. The method of claim 8, wherein the notification torque command causes a vibration of a handwheel.

15. A computer program product comprising a non-transitory computer readable storage device with computer executable instructions stored thereon, the computer executable instructions when executed cause a processing unit to perform a method comprising:
   generating a plurality of torque commands, generating the plurality of torque commands comprises:
      generating a curb torque command in response to detecting a curb condition in which road wheels are stationary despite a change in handwheel position; and
      generating an end-of-travel torque command in response to detecting an end-of-travel condition;
   in response to determining a largest torque command of the curb torque command, the end-of-travel torque command, an understeer torque command, and an oversteer torque command, determining a notification torque command based on the largest toque command; and
   generating a notification torque using the notification torque command.

16. The computer program product of claim 15, wherein the method further comprises, in response to determining an average torque command of the curb torque command, the end-of-travel torque command, an understeer torque command, and an oversteer torque command, determining the notification torque command based on the average torque command.

17. The computer program product of claim 15, wherein generating the plurality of torque commands further comprises generating the understeer torque command in response to detecting an understeer condition, and generating the oversteer torque command in response to detecting an oversteer condition.

18. The computer program product of claim 15, wherein the notification torque command is added to a rack feedback torque command that is corresponding to a rack force.

19. The computer program product of claim 15, wherein the notification torque command is in opposite direction to an input torque being applied by an operator.

20. The computer program product of claim 15, wherein the notification torque command causes a vibration of a handwheel.

* * * * *